(12) United States Patent
Comeras et al.

(10) Patent No.: US 10,284,438 B2
(45) Date of Patent: May 7, 2019

(54) MULTIPATH PROVISIONING OF L4-L7 TRAFFIC IN A NETWORK

(71) Applicant: Cisco Technology, Inc., San Jose, CA (US)

(72) Inventors: Marc Portoles Comeras, Mountain View, CA (US); Preethi Natarajan, Los Gatos, CA (US); Alberto Rodriguez Natal, Leon (ES); Fabio Rodolfo Maino, Palo Alto, CA (US); Alberto Cabellos Aparicio, Barcelona (ES); Vasileios Lakafosis, Mountain View, CA (US); Lorand Jakab, Comuna Feleacu, Jud. Cluj (RO)

(73) Assignee: Cisco Technology, Inc., San Jose, CA (US)

( * ) Notice: Subject to any disclaimer, the term of this patent is extended or adjusted under 35 U.S.C. 154(b) by 547 days.

(21) Appl. No.: 14/612,691

(22) Filed: Feb. 3, 2015

(65) Prior Publication Data

US 2016/0119196 A1    Apr. 28, 2016

(30) Foreign Application Priority Data

Oct. 27, 2014  (EP) .................................. 14465524

(51) Int. Cl.
*H04L 12/24* (2006.01)
*H04L 29/06* (2006.01)
(Continued)

(52) U.S. Cl.
CPC .......... *H04L 41/5054* (2013.01); *H04L 45/24* (2013.01); *H04L 69/14* (2013.01);
(Continued)

(58) Field of Classification Search
None
See application file for complete search history.

(56) References Cited

U.S. PATENT DOCUMENTS 8,880,716 B2 * 11/2014 Riggert ................ H04L 65/608
                                                    370/232
9,462,089 B1 * 10/2016 Fallows ................. H04L 69/22
(Continued)

OTHER PUBLICATIONS

International Search Report and Written Opinion in counterpart International Application No. PCT/US2015/057287, dated Dec. 16, 2015, 9 pages.

(Continued)

*Primary Examiner* — Azizul Choudhury
(74) *Attorney, Agent, or Firm* — Edell, Shapiro & Finnan, LLC

(57) ABSTRACT

Techniques are provided for a network mapping server device in a network to receive a connection upgrade message comprising information to establish a first data flow from a first endpoint that does not support multiple subflows for the first data flow according to a multipath protocol, where multiple subflows subdivide the first data flow across two or more network paths. The information in the connection upgrade message is analyzed in order to resolve network connectivity to determine potential network connections for at least two subflows of the first data flow to a second endpoint. A response message is sent comprising information configured to establish at least two subflows for the first data flow between the first endpoint and the second endpoint.

27 Claims, 5 Drawing Sheets

(51) Int. Cl.
*H04L 12/707* (2013.01)
*H04L 12/801* (2013.01)
*H04L 12/803* (2013.01)

(52) U.S. Cl.
CPC ............ *H04L 69/16* (2013.01); *H04L 69/161* (2013.01); *H04L 47/125* (2013.01); *H04L 47/193* (2013.01)

(56) References Cited

U.S. PATENT DOCUMENTS

| | | | | |
|---|---|---|---|---|
| 2011/0296006 | A1* | 12/2011 | Krishnaswamy | ........................... H04L 29/12952 709/224 |
| 2012/0331160 | A1* | 12/2012 | Tremblay | .......... H04L 29/08702 709/228 |
| 2013/0195004 | A1* | 8/2013 | Hampel | ................... H04L 69/16 370/315 |
| 2014/0122656 | A1* | 5/2014 | Baldwin | ............. H04L 65/4084 709/219 |
| 2015/0124701 | A1* | 5/2015 | Karlsen | .............. H04N 21/2223 370/328 |
| 2015/0319270 | A1* | 11/2015 | Roeland | .............. H04L 61/2007 370/254 |

OTHER PUBLICATIONS

Coudron et al., "Cross-layer Cooperation to Boost Multipath TCP Performance in Cloud Networks", 2013 IEEE 2nd International Conference on Cloud Networking (CloudNet), Nov. 11-13, 2013, 9 pages.
Extended European Search Report for European Application No. 14465524.8-1857, dated Apr. 16, 2015, 5 pages.
Matthieu Coudron et al. "Cross-layer Cooperation to Boost Multipath TCP Performance in Cloud Networks", 2013 IEEE 2nd International Conference on Cloud Networking (CloudNet), Nov. 11, 2013, pp. 58-66.
Raiciu, et al., "Improving Datacenter Performance and Robustness with Multipath TCP," SIGCOMM'11, Aug. 15-19, 2011, 12 pages.
English translation of the First Office Action in counterpart Chinese Application No. 201580004270.2, dated Sep. 13, 2018, 6 pages.

* cited by examiner

US 10,284,438 B2

MULTIPATH PROVISIONING OF L4-L7 TRAFFIC IN A NETWORK

TECHNICAL FIELD

The present disclosure generally relates to the orchestration of a multipath transport of a single data flow among plural paths.

BACKGROUND

A number of transport to application layer protocols (i.e., OSI model L4-L7 protocols) have been developed to improve network efficiency via multipath data flows. These protocols are being increasingly adopted in end-user Operating Systems (OSs) and applications. A common property that these protocols share is that they seek optimizing the use of available network resources from an end-user perspective. Examples of these protocols include Multipath TCP (e.g., per Request For Comments (RFC) 6824), and Quick User Datagram Protocol (UDP) Internet Connections (QUIC). A common trait for these protocols is that they support multipath data flows on both ends of the communication pathway. In order to support these multipath protocols, both endpoints involved must support the underlying protocol mechanism. Thus, in order to provide end-to-end multipath support, a multipath protocol must be agreed to for both endpoints, and since widespread adoption of any given multipath protocol has yet to occur, typically only those vendors that can control both ends of a given deployment can enable and take advantage of such protocols.

DESCRIPTION OF EXAMPLE EMBODIMENTS

Overview

Techniques are provided herein for a network mapping server device in a network to receive a connection upgrade message comprising information to establish a first data flow from a first endpoint that does not support multiple subflows for the first data flow according to a multipath protocol, where multiple subflows subdivide the first data flow across two or more network paths. The information in the connection upgrade message is analyzed in order to resolve network connectivity to determine potential network connections for at least two subflows of the first data flow to a second endpoint. A response message is sent comprising information configured to establish at least two subflows for the first data flow between the first endpoint and the second endpoint.

Example Embodiments

Briefly, the use of multipath protocols, such as Multipath TCP and QUIC, which enable and exploit the presence of multiple network paths between end-hosts, can optimize communication metrics there between. For example, multiple paths provide resilience to failures, reduced network latency and efficient use of available bandwidth. For example, if one path of the plural paths were to fail, the remaining paths can continue communication. Latency may be reduced by way of the parallel nature that a single originating stream of data can be multiplexed across the available paths. Furthermore, path costing can be used to reduce overall costs when traffic can be distributed over less costly paths. In this regard, the paths in the multipath scenario may comprise separate physical paths, redundant paths for high availability (HA) that may use some common physical links, or a combination of different or common physical links.

In a context such as the datacenter, the use of multipath protocols can improve resource utilization efficiency. Since these protocols can be used to load balance traffic across the multiple paths, they may induce a conflict with traditional traffic load-balancers and firewalls, and therefore may need additional support to downgrade multipath flows to single path flows in order to preserve existing network optimization or constraints.

Additionally, the deployment of some multipath protocols challenges the nature of current network deployments and architectures. In many cases, issues like path diversity provisioning and the management of multipath-capable flows are not considered as part of the network design goals. Furthermore, current network deployments lack the appropriate means to seamlessly adopt multipath protocol without disrupting current operations.

The techniques described herein introduce an architecture that leverages and expands some of the advantages of Layer-3 overlays to adopt, manage and exploit the use of multipath protocols. One example protocol that is used to describe the techniques herein separates endpoint location from endpoint network identity, e.g., the Locator/identifier (ID) Separation Protocol (LISP) (or protocols like it).

Figure 1A:
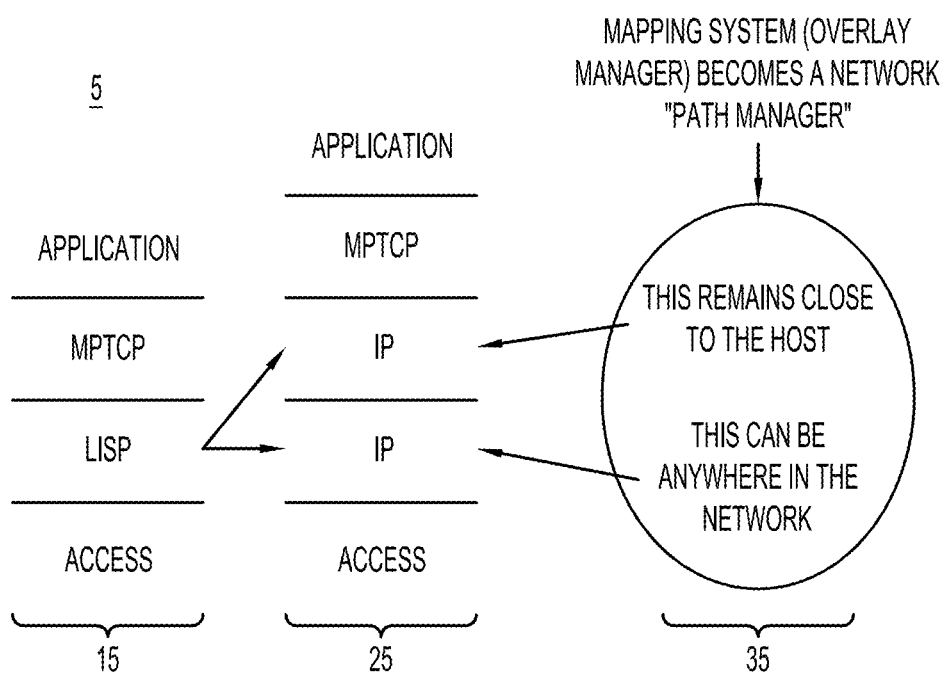
FIG. 1A is an example diagram of a location and identity separation model to enable multipath networking according to the techniques described herein.

These techniques build on an observation that L4-L7 multipath protocols can operate by way of sub-flow management and is described herein as a LISP overlay that essentially operates as an underlay with respect to the sub-flows to manage the provisioning of the multiple paths. When the underlay is an L3 overlay solution, such as LISP, then multipath provisioning and management can be decoupled and distributed independently of sub-flow generation. FIG. 1A illustrates this observation when combining Multi-Path Transport Control Protocol (MPTCP) (L4) and LISP (L3 underlay).

Referring first to FIG. 1A, an example split protocol stack is shown in table 5 for a given endpoint (e.g., a Virtual Machine (VM) or device). The protocol stack has an application or higher layers, a transport layer (e.g., MPTCP), and Internet Protocol (IP) layer (e.g., Layer 3/LISP), and an access layer (Layer 1/Layer 2) indicated generally at reference numeral 15. LISP supplies two IP addresses as shown in the center of table 5 at reference numeral 25. At further described with respect to reference numeral 35, one IP address is for the device endpoint identity (EID) that remains with the device (or host as indicated in table 5) and one for the location identity (i.e., the endpoint's attached location (RLOC), typically a router) above the access layer. As used herein a device may be a hardware based device on a printed circuit board or a virtual device such as a VM in which multiple VMs may run on a hypervisor platform. In addition, an overview of LISP is described hereinafter in connection with FIG. 1B.

Figure 1B:
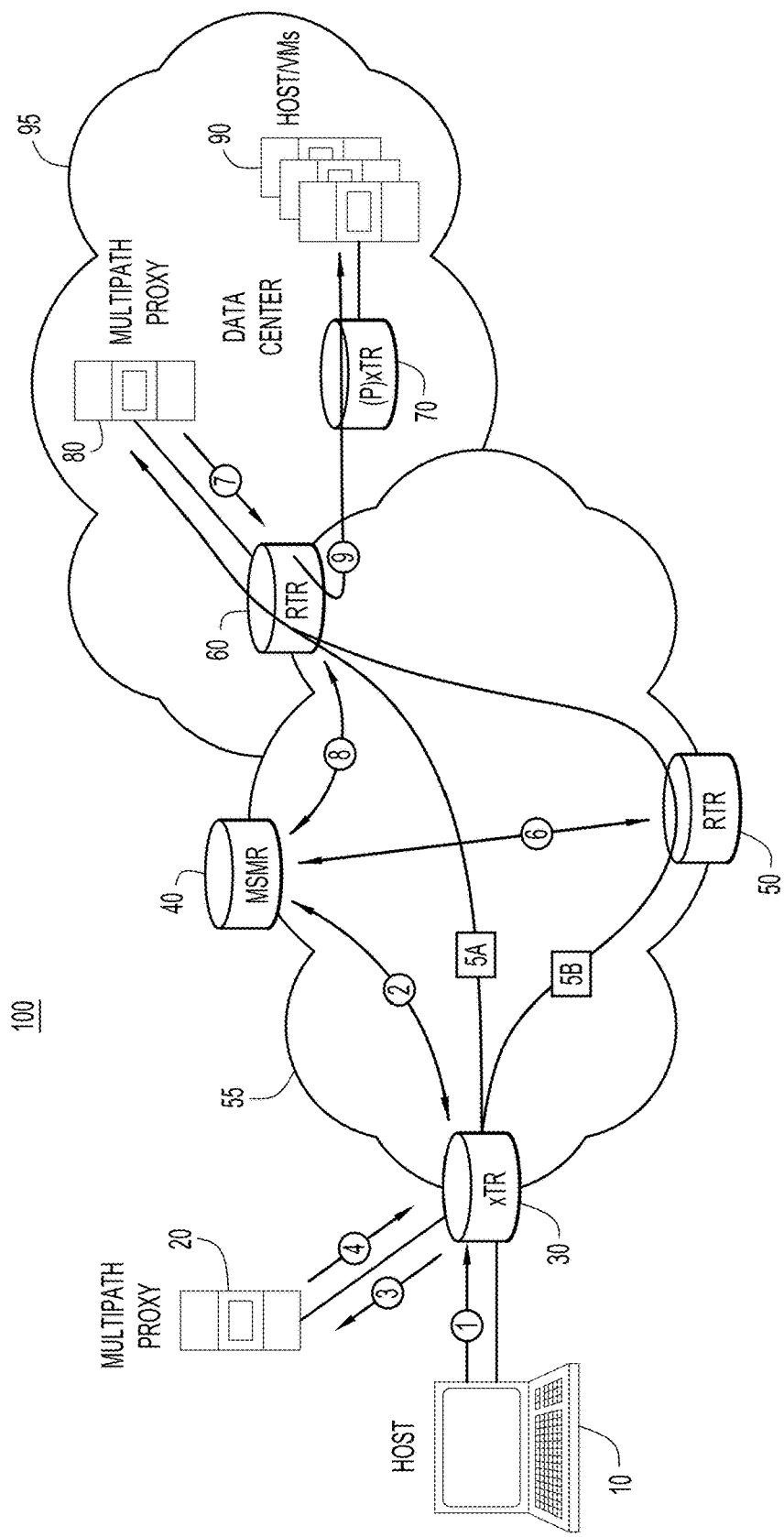
FIG. 1B is an example of a host and datacenter networking environment to enable multipath networking according to the techniques described herein.

Referring next to FIG. 1B, an example system 100 is shown. System 100 comprises a user endpoint or host 10 that may obtain services provided by host/VMs 90 in a datacenter 95. To facilitate multipath traffic according to the techniques provided herein, a number of mediating devices are shown that communicate via network 55. For example, on the edge of network 55 are xTunnel Router (xTR) 30, Re-encapsulation Tunnel Router (RTR) 60 and Proxy (P)xTR 70. In addition, multipath proxies 20 and 80, and a Mapping Server/Mapping Resolver (MSMR) 40 are depicted. In this example, an xTR may comprise an Ingress TR (ITR) or Egress TR (ETR) depending on whether the traffic in ingress traffic or egress traffic with respect to that router in accordance with LISP parlance (i.e., traffic into the router from an endpoint is ingress traffic while traffic from the router to the endpoint is egress traffic). RTRs and MSMRs are also LISP constructs that may be adapted according to the techniques described herein. In many cases the xTRs operate in accordance with, in this example, LISP protocol standards. Datacenter 95 may also house Fibre-Channel (FC) servers and FC storage arrays as part of a networked Storage Area Network (SAN), as well as other networking and support equipment.

LISP routers (ITR, ETR, xTR, PxTR, etc.) may encapsulate, re-encapsulate or decapsulate network traffic. An advantage of LISP is that the endpoint's EID can be a constant for that endpoint in that it typically will not change, and when the endpoint moves, the RLOC is updated to catalog the move to the newly attached router (while the EID is unchanged). A mapping server (e.g., MSMR 40) correlates the EID with the RLOC. Accordingly, endpoint traffic is routed between the RLOC's of each endpoint with final address resolution being provided by the RLOC router for that endpoint (e.g., as configured by the MSMR). Generally, this simplifies routing to be between a lesser number of RLOC routers (as opposed to endpoint-to-endpoint) since the ingress and egress traffic is re-addressed at the endpoint's attached router.

In a conceptual example, consider a core network with 5 routers (n=5) in a convex (ring) configuration (i.e., there is no router without attached endpoints mediating between any of the other routers) and where each router supports 100 endpoints (m=100). If each router has a single route to every other router then each router supports five core routes, one route to each of the other four routers and the MSMR (i.e., four routes plus one route to the MSMR), and 100 endpoint routes to the router's attached endpoints for a total of 105 routes. This example is simplified to illustrate the basic benefits of LISP without describing the complexities of actual network operations. In the absence of LISP, each router would support endpoint routes to its 100 attached endpoints and potentially to the attached endpoints of each of the other routers for a total of ~500+ endpoint-to-endpoints routes (without combinations). Thus, in a simplified manner the LISP tunnel condenses routing to the core routers separately from their endpoints, thereby reducing router processing and freeing expensive router memory resources. In addition, LISP tunneling can be used to force routing (e.g., traffic steering for quality of service (QoS), load balancing, etc.) to specific routes.

As described above, in order to enable multipath protocols each endpoint has to support a common multipath protocol, i.e., if MPTCP is used, then each endpoint must support MPTCP or if QUIC is used, then each endpoint must support QUIC. In contrast, the techniques described herein enable endpoints that do not support a given multipath protocol to interface with a network or network components that do support multipath protocols, thereby obtaining the underlying advantages that a given multipath protocol offers. Furthermore, the techniques described herein extend the multipath protocol availability to endpoints that are not aware of the use of LISP (or other overlaying technologies). As viewed in FIG. 1B, devices in network 55 and the associated TRs (30, 50, 60 and 70) may be considered to be multipath protocol enabled, while host 10 (and host/VMs 90) may be considered to not be configured to use a multipath protocol.

As shown in FIG. 1B, at reference numeral 1, host 10 starts a data flow (or data packets) that crosses xTR 30, e.g., it starts a connection with host/VMs 90. The xTR 30 recognizes that a new flow has been initiated by host 10, and at 2, queries MSMR 40 with the flow information. In this example, the flow from host 10 does not support a multipath protocol and MSMR 40 responds with instructions for xTR 30 to encapsulate and forward the new flow traffic to multipath proxy 20. In other words, the new flow is redirected to multipath proxy 20. It should be noted that reference numerals 2, 6 and 8 refer to messaging/signaling interfaces with the MSMR 40, while reference numerals 1, 3, 4, 5, 7 and 9 denote the corresponding underlying data flows. At 3, xTR 30 forwards the encapsulated traffic to multipath proxy 20. At 4, multipath proxy 20 starts a multipath flow to host/VMs 90. In this example, two forwarding paths are shown at reference numerals 5A and 5B. In this regard, multipath proxy 20 has established at least two multipath protocol paths that the xTR 30 may use for forwarding; one path through RTR 60 and the other path through RTR 50. In other words, the data from host 10 via data flows 1, 3 and 4 is converted to a multipath protocol capable flow by multipath proxy 20, i.e. the data flow at 1 is divided into flows 5A and 5B.

In one example, the multipath proxy 20 may be a network appliance such as a blade server or a VM residing at a convenient location in the network or datacenter such as a VM attached to the datacenter switched fabric. In this example, path 5A may be the natural single flow path to host/VMs 90 through the LISP overlay. However, MSMR 40 has the intelligence to be aware of the network topology that is made available by RTR 50 and initiates a diverse flow by adding path forwarding information for flow 5B. If such a path via RTR 50 were not available, MSMR 40 may inform the network operator to add an RTR to the network (e.g., to add RTR 50) to enable the multipath protocol. In another example, MSMR 40 may provide signaling to instantiate an RTR as a VM to service additional multipath protocol flows to thereby take advantage of multipath protocol path diversity.

In another example, MSMR 40 sets up forwarding information for flow 5B which eventually reaches RTR 50 via xTR 30, a flow for which RTR 50 may not be aware of. Accordingly, via signaling at 6, RTR 50 queries MSMR 40 for information on where to direct or redirect flow 5B. In this example, MSMR 40 directs flows 5A and 5B using its mapping functions to RTR 60 due to host/VMs 90 not being multipath protocol capable, and further informs RTR 60 via signaling at 8. Flows 5A and 5B are then directed to multipath proxy 80 which closes the multipath protocol flows and converts the multiple multipath protocol flows to a single flow to be sent to host/VMs 90 via (P)xTR 70.

In the overall example presented in FIG. 1B both the host 10 and the host/VMs 90 are not multipath protocol capable (as described above). The techniques described herein provide multipath proxies to take advantage of LISP (or other separation protocols) connections in network 55 (e.g., 105 versus 500+ interconnects as describe above). The multipath proxies 20 or 80 may be VMs instantiated at representative locations or locations that provide a nexus to their underlying non-multipath protocol endpoints. In this regard, a single flow that is changed to a multipath flow may be said to be upgraded to a multipath protocol flow, while a multipath flow may be said to be downgraded to a single flow by way of flow redirection to the appropriate proxy.

Thus, as shown in FIG. 1B, the end-to-end flows are both upgraded and downgraded via proxies at both ends of the flow(s). The techniques described herein provide for both the instantiation of proxies and RTRs (or xTRs or other separation protocol (LISP) devices). The proxies initiate and/or terminate multipath protocol flows while RTRs or other path diverse device provide the multipath diversity enabled by LISP or other convenient overlaying L3 protocol that can enable the L4-L7 multipath protocol overlay/underlay efficiencies described herein. Both the instantiation of RTRs and proxies may be centralized by the MSMR 40 or by a distributed management function, and may be by the design of the network operator or between different vendors, thereby enabling and extending multipath protocol efficiencies when the end-to-end communication function is not controlled by a single vendor or entity. Furthermore, it is of note that one endpoint may not need multipath protocol proxy or RTR-like services, and as such only those data flow sources or terminals that do not have inherent multipath protocol capability may use the support of a multipath proxy (e.g., multipaths proxies 20 or 80).

Figure 2:
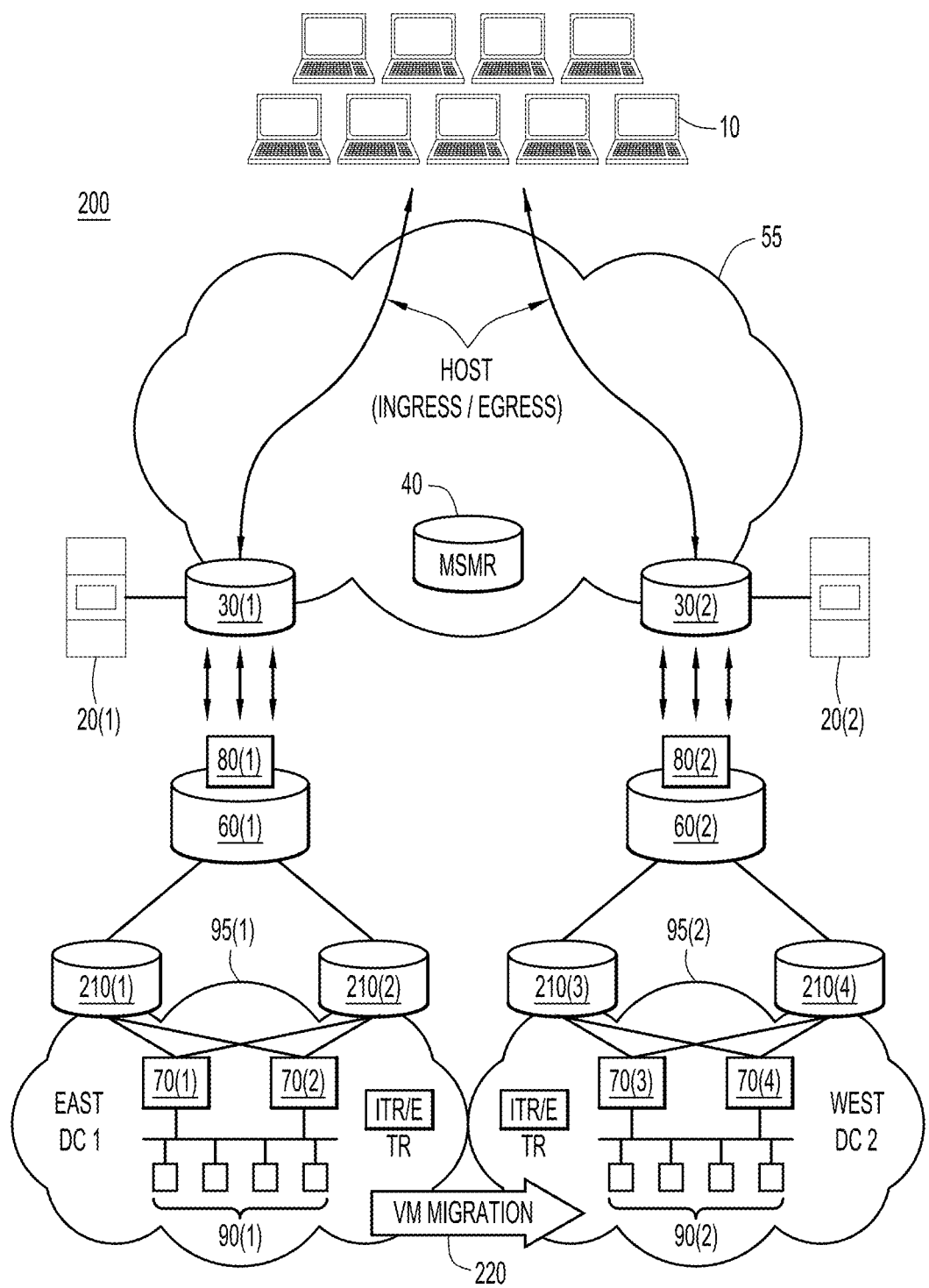
FIG. 2 is an example of a multiple datacenter networking environment to enable multipath networking according to the techniques described herein.

Turning now to FIG. 2, an inter-datacenter network 200 and the corresponding communication for multipath protocol operations is described according to the techniques described herein. Briefly, a number of network constructs and their corresponding reference numerals in FIG. 1B have been reused in FIG. 2. Two datacenters 95(1) and 95(2) are depicted as East and West datacenters, respectively. The datacenters 95(1) and 95(2) may represent public or private clouds, or combinations of both in hybrid cloud extensions of a datacenter. In this example implementation, proxy orchestration (i.e., the maintenance, teardown or instantiation, or physical installation of multipath proxies) facilitates an optimal use of resources in both the public and private clouds.

In this example, plural hosts 10 may be remote from each other, mobile or part of a Local Area Network (LAN) or Virtual LAN (VLAN). Network 55 may be representative of a corporate network, Virtual Private Network (VPN), Wide Area Network (WAN), among others. In this regard, RTRs 30(1) and 30(2) provide interfaces (e.g., LISP constructs) to respective datacenters 95(1) and 95(2), e.g., over a WAN or the Internet. Collocated with or coupled to RTRs 30(1) and 30(2) are multipath proxies 20(1) and 20(2). Multipath proxies 20(1) and 20(2) are positioned at the edge of network 55, and as such, may proxy between clouds 95 and network 55 for either ingress or egress traffic operations. Also connected to network 55 is a mapping server (e.g., MSMR 40). Between network 55 and clouds 95 are routers 60 (e.g., Internet routers) and at the edge of each cloud 95 are switches or routers 210(1), 210(2), 210(3) and 210(4) providing multipath diversity to the datacenter architecture. As shown in FIG. 2, the Internet routers 60 may have attached MSMRs 80(1) and 80(2) that may also be connected or located elsewhere in Network 55. MSMRs 80 are part of a mapping system infrastructure that guarantees updated mapping and network topology information and synchronization among devices.

The environment depicted in FIG. 2 can accommodate network operations such as cloud bursting and service migration with full multipath/multiflow support regardless of end-host/VM support. Thus, a number or routers (or switches) 70(1)-70(4) in the respective datacenter cores can enable ETR/ITR functionality for VMs 90(1) and 90(2) as viewed in FIG. 2.

Thus, an orchestrated distributed multipath provisioning is enabled when the underlying routing infrastructure does not provide multiple network paths (e.g., to improve bandwidth, resilience or delay). The techniques described herein can be used to increase end-to-end path diversity. For example, when an xTR queries the mapping system (MSMR) at 2 (FIG. 1B) to encapsulate packets on the overlay, the mapping system may reply with mapping information to steer subflows to multiple network overlay landmarks (RTRs) (5) that are reachable through different network paths. These overlay points will re-encapsulate subflows to the destination for final decapsulation.

Furthermore, a single-path downgrade for is provided for legacy datacenters, i.e., when a datacenter (or any other network deployment) is not ready to support multiflow/multipath protocols a downgrade of multipath/multiflow traffic to single flow traffic is enabled. Thus, mobility support for multiflow enabled hosts is provided. For example, one of VMs 90(1) may migrate from East DC1 to West DC2 and join VMs 90(2). This process enables the possibility to move hosts in a Datacenter Interconnect (DCI) environment while still supporting multiple flows and optimal routing. Accordingly, with the level of indirection that LISP provides, hosts can move across datacenters while the LISP infrastructure maintains multipath provisioning without disruption.

Thus, endpoint identity preservation is maintained as LISP encapsulation both in end-to-end communications as well as when traversing network re-encapsulation landmarks, host-to-host identity (address) is preserved. As such, network services can also be preserved such as firewalls or traffic accelerators. Accordingly, as shown in FIG. 2, the RTR+Proxy (30 and 20) functions can be deployed at the edge of a multi-site datacenter (e.g., East DC1 and West DC2).

Figure 3:
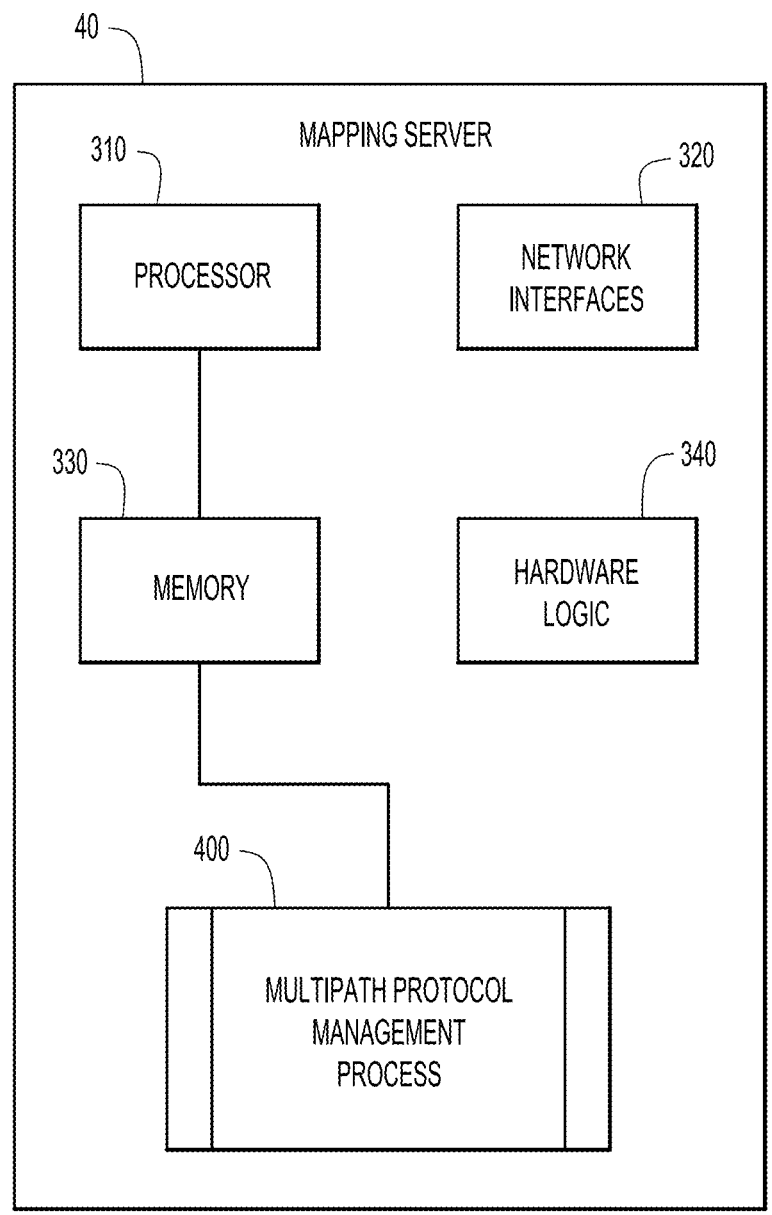
FIG. 3 is an example block diagram of the centralized management device configured to perform functions for the techniques described herein.

An example architecture of a MSMR, e.g., MSMR 40, is depicted and described in connection with FIG. 3. Referring to FIG. 3, MSMR 40 comprises a data processing device 310, a plurality of network interfaces 320, a memory 330 and hardware logic 340. Resident in the memory 330 is software for a multipath protocol management process 400. Process 400 may also be implemented in hardware using hardware logic 340, or be implemented in a combination of both hardware and software. Process 400 includes operational processes regarding the creation, merging, orchestration, updating and use of data flows according to a multipath provisioning process as described above, and is further described in connection with FIG. 4.

The data processing device 310 is, for example, a microprocessor, a microcontroller, systems on a chip (SOCs), or other fixed or programmable logic. The data processing device 310 is also referred to herein simply as a processor.

The memory 330 may be any form of random access memory (RAM) or other data storage block that stores data used for the techniques described herein. The memory 330 may be separate or part of the processor 310. Instructions for performing the process 400 may be stored in the memory 330 for execution by the processor 310 such that when executed by the processor, causes the processor to perform the operations describe herein in connection with the above figures. The network interfaces 320 enable communication over network 55 or datacenter 95 shown in FIG. 1B. It should be understood that any of the devices in system 100 or 200 may be configured with a similar hardware or software configuration as MSMR 40, e.g., hosts 10 or xTRs.

The functions of the processor 310 may be implemented by a processor or computer readable tangible non-transitory medium encoded with instructions or by logic encoded in one or more tangible media (e.g., embedded logic such as an application specific integrated circuit (ASIC), digital signal processor (DSP) instructions, software that is executed by a processor, etc.), wherein the memory 330 stores data used for the computations or functions described herein (and/or to store software or processor instructions that are executed to carry out the computations or functions described herein). Thus, functions of the process 400 may be implemented with fixed logic or programmable logic (e.g., software or computer instructions executed by a processor or field programmable gate array (FPGA)).

Hardware logic 340 may be used to implement FC forwarding function and perform hardware programming, e.g., at an ASIC level, without involving the switch Central Processing Unit (CPU), e.g., processor 310, or a separate processor associated with one of the network interfaces 320. The hardware logic 340 may be coupled to processor 310 or be implemented as part of processor 310.

Figure 4:
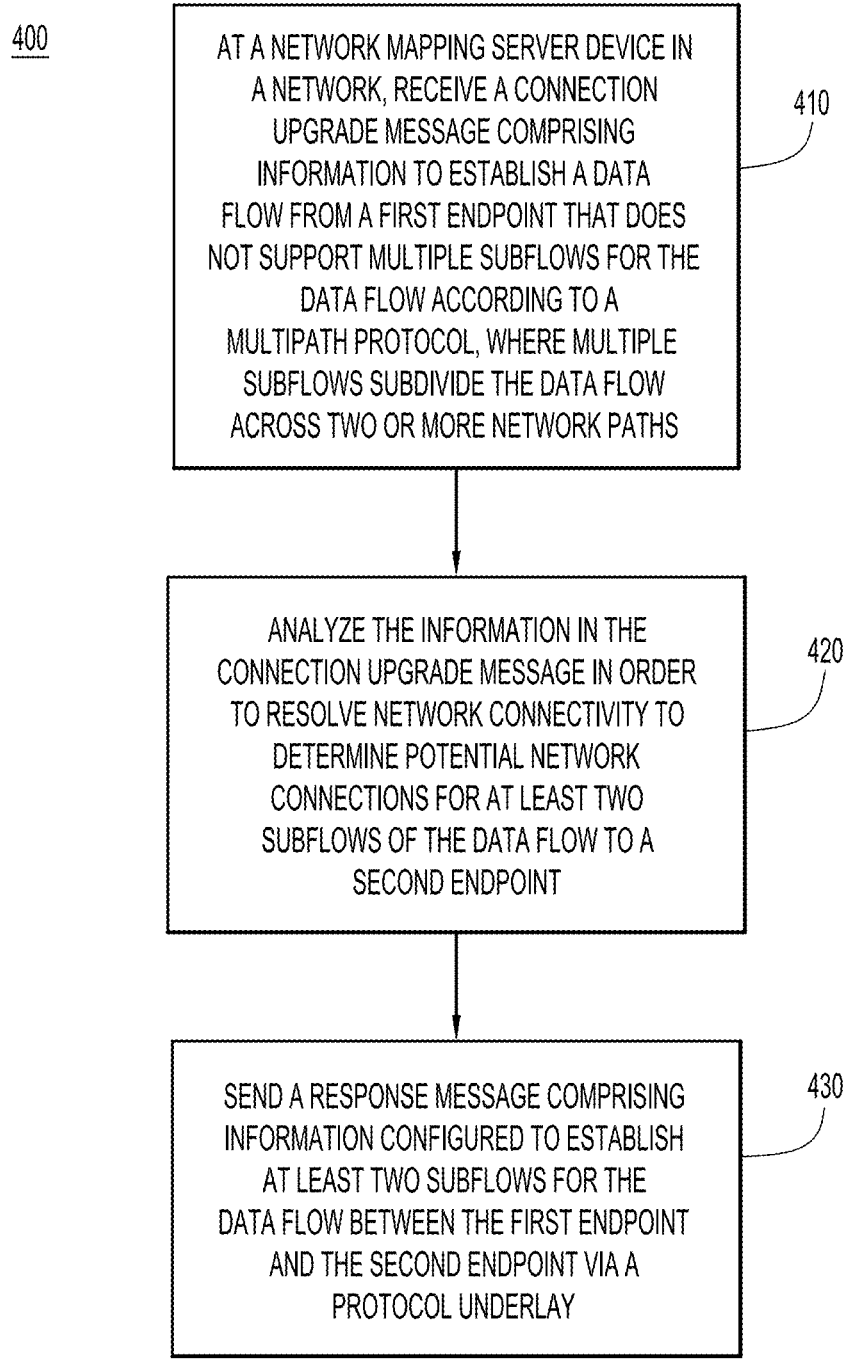
FIG. 4 is an example flow chart generally depicting a multipath protocol management process performed on a network device according to the techniques described herein.

Referring to FIG. 4, an example of a flowchart is shown that generally depicts the operations of process 400 that facilitates multipath communication when either or both endpoints are not multipath protocol enabled according to the techniques described herein. At 410, at a network mapping server device (e.g., MSMR 40) in a network, a connection upgrade message is received comprising information to establish a data flow from a first endpoint (e.g., a host 10) that does not support multiple subflows for the first data flow according to a multipath protocol, where multiple subflows subdivide (or multiplex) the data flow across two or more network paths (e.g., paths 5A and 5B).

The mapping server device may be part of a mapping service that maintains mappings associating device identifiers (and their functions) to locations, e.g., EID to RLOC mappings. In this regard, the connection upgrade message can redirect a single flow to a proxy that can generate multiple subflows from the single flow, e.g., as orchestrated by the mapping server device. Similarly, when a connection downgrade message is received (as described above), forwarding/mapping information may be sent within the network or to an RTR so that the multiple subflows are redirected to a proxy device that is configured to merge multiple subflows between endpoints such as multiple subflows from the second endpoint are merged to a single flow to the first endpoint.

At 420, the information in the connection upgrade message is analyzed in order to resolve network connectivity to determine potential network connections for at least two subflows of the data flow to a second endpoint. For example, it may be determined whether two service flows should be made available within the given network. At 430, a response message is sent comprising information configured to establish at least two subflows for the data flow between the first endpoint and the second endpoint via a protocol underlay.

The response message from the map server may inform the encapsulating device to redirect the flow to a proxy that will subdivide (or multiplex) the data flow (e.g., a first data flow) into the multiple subflows to the second device. A map request with connection downgrade message may be received by the MSMR comprising information to downgrade multiple subflows from the second endpoint into a data flow (e.g., a second data flow) to the first endpoint, where multiple subflows from the second endpoint are merged into the second data flow as a single data flow to the first endpoint. The response message will instruct the encapsulating device to redirect the flow to a servicing proxy device in order for the multipath flow to be merged into a single flow for the respective endpoint (i.e., responsive to the connection downgrade message, a merge message may be sent to the proxy device that is configured to merge multiple subflows from the second endpoint to the first endpoint).

Analyzing the connection upgrade message may comprises determining at least two network devices in the network to separately forward one of each of the two subflows. When it is determined that at least two paths are not available to support the at least two subflows, a message may be sent comprising information configured to establish network paths for the at least two subflows by way of adding one of a virtual or a hardware tunnel router in support of multipath data flows to one or both of the first and second endpoints. When it is determined that at least two paths are not available to support the at least two subflows, a message may be sent comprising information configured to establish network paths for the at least two subflows by way of adding one of a virtual or a hardware proxy device in support of multipath data flows to one or both of the first and second endpoints.

The techniques described herein have several advantages including largely simplifying the management and deployment of network resources in the presence of multipath/multiflow protocols. In addition, operators that do not have control on both ends of the communication (e.g., the datacenter and the end-host) can exploit the advantages of multipath protocols. In other words, the Layer 3 underlay/overlay mechanism provides an abstraction layer to leverage the underlying Layer 4 to Layer 7 multipath protocol advantages without vendor specific controls.

In summary, the techniques described herein improve network path costing and flow efficiency. The techniques provided herein provide for a network mapping server device in a network to receive a connection upgrade message comprising information to establish a first data flow from a first endpoint that does not support multiple subflows for the first data flow according to a multipath protocol, where multiple subflows subdivide the first data flow across two or more network paths. The information in the connection upgrade message is analyzed in order to resolve network connectivity to determine potential network connections for at least two subflows of the first data flow to a second endpoint. A response message is sent comprising information configured to establish at least two subflows for the first data flow between the first endpoint and the second endpoint via a protocol underlay.

The above description is intended by way of example only.

What is claimed is:

1. A method comprising:
   at a network mapping server device in a network, receiving, from a network router, a connection upgrade message comprising information to establish a first data flow from a first endpoint that does not support multiple subflows for the first data flow according to a multipath protocol, wherein multiple subflows subdivide the first data flow across two or more network paths;

analyzing the information in the connection upgrade message in order to resolve network connectivity to determine network connections for at least two subflows of the first data flow to a second endpoint;

sending a response message comprising information configured to establish at least two subflows for the first data flow between the first endpoint and the second endpoint;

receiving a query, triggered by receipt of one of the at least two subflows, from another network router, which is in a path for the one of the at least two subflows, regarding where to direct the one of the at least two subflows; and in response to the query, sending instructions to the another network router regarding where to direct the one of the at least two subflows, wherein the network mapping server device instantiates the network router and the another network router.

2. The method of claim 1, wherein sending comprises sending the response message to a proxy device that is configured to subdivide the first data flow into the multiple subflows to the second device.

3. The method of claim 1, further comprising:
receiving a connection downgrade message comprising information to downgrade multiple subflows from the second endpoint into a second data flow to the first endpoint, wherein multiple subflows from the second endpoint are merged into the second data flow as a single data flow to the first endpoint.

4. The method of claim 3, responsive to the connection downgrade message, sending a merge message to a proxy device that is configured to merge multiple subflows from the second endpoint to the first endpoint.

5. The method of claim 1, wherein analyzing comprises determining at least two network devices in the network to separately forward one of each of the two subflows.

6. The method of claim 1, wherein analyzing comprises determining that the first endpoint does not support the generation of multiple subflows so that its flows are candidates to be redirected to a proxy device that can subdivide the first data flow into the multiple subflows to the second endpoint.

7. The method of claim 1, wherein analyzing comprises determining that the first endpoint does not support the reception of multiple subflows so that multiple subflows from the second endpoint are candidates to be redirected to a proxy device that merges the subflows into a single flow to the first endpoint.

8. The method of claim 1, wherein analyzing comprises determining that at least two paths are not available to support the at least two subflows and further comprising sending a message comprising information configured to establish network paths for the at least two subflows byway of adding one of a virtual or a hardware tunnel router to the network in support of one or both of the first and second endpoints.

9. The method of claim 1, wherein analyzing comprises determining that at least two paths are not available to support the at least two subflows and further comprising sending a message comprising information configured to establish network paths for the at least two subflows by way of adding one of a virtual or a hardware proxy device to the network in support of one or both of the first and second endpoints.

10. A network mapping server device comprising:
one or more network interfaces configured to communicate over a network; and
a processor configured to be coupled to the one or more network interfaces and configured to:
receive, at the network mapping server device from a network router, a connection upgrade message comprising information to establish a first data flow from a first endpoint that does not support multiple subflows for the first data flow according to a multipath protocol, wherein multiple subflows subdivide the first data flow across two or more network paths;
analyze the information in the connection upgrade message in order to resolve network connectivity to determine network connections for at least two subflows of the first data flow to a second endpoint;
send a response message comprising information configured to establish at least two subflows for the first data flow between the first endpoint and the second endpoint;
receive a query, triggered by receipt of one of the at least two subflows, from another network router, which is in a path for one of the at least two subflows, regarding where to direct the one of the at least two subflows; and
in response to the query, send instructions to the another network router regarding where to direct the one of the at least two subflows,
wherein the network mapping server device instantiates the network router and the another network router.

11. The apparatus of claim 10, wherein the processor is configured to send the response message to the proxy device that is configured to subdivide the first data flow into the multiple subflows to the second device.

12. The apparatus of claim 10, wherein the processor is further configured to:
receive a connection downgrade message comprising information to downgrade multiple subflows from the second endpoint into a second data flow to the first endpoint, wherein multiple subflows from the second endpoint are merged into the second data flow as a single data flow to the first endpoint.

13. The apparatus of claim 12, wherein responsive to the connection downgrade message, the processor is further configured to send a merge message to the proxy device that is configured to merge multiple subflows from the second endpoint to the first endpoint.

14. The apparatus of claim 10, wherein the processor is configured to analyze the information in the connection upgrade message in order to determine at least two network devices in the network to separately forward one of each of the two subflows.

15. The apparatus of claim 10, wherein the processor is configured to analyze the information in the connection upgrade message in order to determine that the first endpoint does not support the generation of multiple subflows so that its flows are candidates to be redirected to a proxy device that can subdivide the first data flow into the multiple subflows to the second endpoint.

16. The apparatus of claim 10, wherein the processor is configured to analyze the information in the connection upgrade message in order to determine that the first endpoint does not support the reception of multiple subflows so that multiple subflows from the second endpoint are candidates to be redirected to a proxy device that merges the subflows into a single flow to the first endpoint.

17. The apparatus of claim 10, wherein the processor is configured to analyze the information in the connection upgrade message in order to determine that at least two paths are not available to support the at least two subflows and further comprising sending a message comprising information configured to establish network paths for the at least two subflows by way of adding one of a virtual or a hardware tunnel router to the network in support of multipath data flows to one or both of the first and second endpoints.

18. The apparatus of claim 10, wherein the processor is configured to analyze the information in the connection upgrade message in order to determine that at least two paths are not available to support the at least two subflows and further comprising sending a message comprising information configured to establish network paths for the at least two subflows by way of adding one of a virtual or a hardware proxy device to the network in support of multi path data flows to one or both of the first and second endpoints.

19. One or more computer readable storage media encoded with software comprising computer executable instructions and when the software is executed operable to:
receive, at a network mapping server device from a network router, a connection upgrade message comprising information to establish a first data flow from a first endpoint that does not support multiple subflows for the first data flow according to a multipath protocol, wherein multiple subflows subdivide the first data flow across two or more network paths;
analyze the information in the connection upgrade message in order to resolve network connectivity to determine network connections for at least two subflows of the first data flow to a second endpoint;
send a response message comprising information configured to establish at least two subflows for the first data flow between the first endpoint and the second endpoint;
receive a query, triggered by receipt of one of the at least two subflows, from another network router, which is in a path for the one of the at least two subflows, regarding where to direct the one of the at least two subflows; and
send instructions to the another network router regarding where to direct the one of the at least two subflows,
wherein the network mapping server device instantiates the network router and the another network router.

20. The computer readable storage media of claim 19, wherein the instructions that send comprise instructions configured to send the response message to the proxy device that is configured to subdivide the first data flow into the multiple subflows to the second device.

21. The computer readable storage media of claim 19, further comprising instructions operable to:
receive a connection downgrade message comprising information to downgrade multiple subflows from the second endpoint into a second data flow to the first endpoint, wherein multiple subflows from the second endpoint are merged into the second data flow as a single data flow to the first endpoint.

22. The computer readable storage media of claim 21, further comprising instructions, responsive to the connection downgrade message, operable to send a merge message to the proxy device that is configured to merge multiple subflows from the second endpoint to the first endpoint.

23. The computer readable storage media of claim 19, wherein the instructions that analyze comprise instructions to analyze the information in the connection upgrade message in order to determine at least two network devices in the network to separately forward one of each of the two subflows.

24. The computer readable storage media of claim 19, wherein the instructions that analyze comprise instructions to analyze the information in the connection upgrade message in order to determine that the first endpoint does not support the generation of multiple subflows so that its flows are candidates to be redirected to a proxy device that can subdivide the first data flow into the multiple subflows to the second endpoint.

25. The computer readable storage media of claim 19, wherein the instructions that analyze comprise instructions to analyze the information in the connection upgrade message in order to determine that the first endpoint does not support the reception of multiple subflows so that multiple subflows from the second endpoint are candidates to be redirected to a proxy device that merges the subflows into a single flow to the first endpoint.

26. The computer readable storage media of claim 19, wherein the instructions that analyze comprise instructions to analyze the information in the connection upgrade message in order to determine that at least two paths are not available to support the at least two subflows and further comprise instructions to send a message comprising information configured to establish network paths for the at least two subflows by way of adding one of a virtual or a hardware tunnel router to the network in support of multipath data flows to one or both of the first and second endpoints.

27. The computer readable storage media of claim 19, wherein the instructions that analyze comprise instructions to analyze the information in the connection upgrade message in order to determine that at least two paths are not available to support the at least two subflows and further comprise instructions to send a message comprising information configured to establish network paths for the at least two subflows by way of adding one of a virtual or a hardware proxy device to the network in support of multi path data flows to one or both of the first and second endpoints.

* * * * *